US011975440B2

(12) United States Patent
Brull

(10) Patent No.: US 11,975,440 B2
(45) Date of Patent: *May 7, 2024

(54) LANYARD SYSTEM

(71) Applicant: James Gregory Brull, Leander, TX (US)

(72) Inventor: James Gregory Brull, Leander, TX (US)

(*) Notice: Subject to any disclaimer, the term of this patent is extended or adjusted under 35 U.S.C. 154(b) by 358 days.

This patent is subject to a terminal disclaimer.

(21) Appl. No.: 17/153,868

(22) Filed: Jan. 20, 2021

(65) Prior Publication Data

US 2021/0138626 A1    May 13, 2021

Related U.S. Application Data

(63) Continuation-in-part of application No. 15/090,261, filed on Apr. 4, 2016, now Pat. No. 10,926,400.

(51) Int. Cl.
*B25H 3/00* (2006.01)
*B23B 45/00* (2006.01)
(Continued)

(52) U.S. Cl.
CPC .......... *B25H 3/003* (2013.01); *B23B 45/003* (2013.01); *B25B 23/0035* (2013.01); *B25F 1/04* (2013.01); *B25F 5/029* (2013.01); *B25G 1/08* (2013.01)

(58) Field of Classification Search
CPC ... B25G 1/085; B25G 1/08; B25F 1/04; B25F 5/029; B25F 1/02; B25H 3/003; B23B 45/003; B25B 23/0035
See application file for complete search history.

(56) References Cited

U.S. PATENT DOCUMENTS 2,635,661 A * 4/1953 Egan .................. B25F 1/04
                                        7/165
3,006,395 A * 10/1961 Dye ................... B25G 1/085
                                        81/177.4
(Continued)

FOREIGN PATENT DOCUMENTS

CN    107297715 A * 10/2017 .......... B25F 1/04
CN    109047855 A * 12/2018
(Continued)

*Primary Examiner* — Taylor Morris
(74) *Attorney, Agent, or Firm* — Craft Chu PLLC; Andrew W. Chu

(57) ABSTRACT

Described herein is a novel lanyard system for removable pieces connected to and detached from a piece receiver of a power tool. The system includes one or more lanyard assemblies, each with a two ended strap and a retraction system fixed to the tool all in a storage region outside of the tool. In particular, one end of the strap is connected to the piece and the other strap end is connected to one end of the retraction system. The other end of the retraction system is connected to the outside of the tool. The strap is of sufficient length for the retraction system to retract a piece to the storage region outside the tool after disconnection from the piece receiver. It is contemplated that the retraction system includes at least one spring assembly to cause the lanyard system to remain under tension while the piece is mounted in a piece receiver, thereby preventing or at least reducing the strap from interfering with the task at hand, the piece, the piece receiver or tool itself. The retraction system has sufficient tensional force to cause the retraction of a piece to the storage region once released from the work region of the tool.

20 Claims, 10 Drawing Sheets

(51) Int. Cl.
    *B25B 23/00*         (2006.01)
    *B25F 1/04*          (2006.01)
    *B25F 5/02*          (2006.01)
    *B25G 1/08*         (2006.01)

(56) References Cited

U.S. PATENT DOCUMENTS

| | | | | |
|---|---|---|---|---|
| 3,750,729 A * | 8/1973 | Lemieux | ............... | B25G 1/085 81/439 |
| 4,372,362 A * | 2/1983 | Ahn | ............... | B25G 1/085 81/436 |
| 4,815,346 A * | 3/1989 | Littlehorn | ............... | B25B 15/00 81/439 |
| 4,928,381 A * | 5/1990 | Yaguchi | ............... | B23Q 3/15706 408/35 |
| 5,024,566 A * | 6/1991 | Ippolito | ............... | B23B 51/00 81/439 |
| 5,325,745 A * | 7/1994 | Koehler | ............... | B25F 1/04 81/439 |
| 5,337,637 A * | 8/1994 | Bih-Lien | ............... | B25G 1/085 81/439 |
| 5,421,225 A * | 6/1995 | Chen | ............... | B25F 1/02 81/177.4 |
| 6,138,537 A * | 10/2000 | Cole | ............... | B25F 1/04 81/439 |
| 6,205,893 B1 * | 3/2001 | Sato | ............... | B25B 15/02 81/439 |
| 6,490,955 B2 * | 12/2002 | Chang-Kao | ............... | B25G 1/085 81/439 |
| 6,511,199 B1 * | 1/2003 | Chung | ............... | B25G 1/085 362/120 |
| 7,000,509 B2 * | 2/2006 | Shiao | ............... | B25B 15/02 81/439 |
| 7,073,417 B2 * | 7/2006 | Beauchamp | ............... | B25F 5/029 81/177.4 |
| 7,250,023 B2 * | 7/2007 | Bai | ............... | B25F 5/029 483/65 |
| 7,275,466 B2 * | 10/2007 | Cluthe | ............... | B25F 1/04 81/439 |
| 7,493,838 B2 * | 2/2009 | Beauchamp | ............... | B25G 1/085 81/177.4 |
| 7,866,235 B2 * | 1/2011 | Hi | ............... | B25G 1/085 81/177.8 |
| 8,047,100 B2 * | 11/2011 | King | ............... | B25F 5/021 81/57.37 |
| 8,231,512 B2 * | 7/2012 | Schmidt | ............... | B25F 5/029 483/57 |
| 8,250,950 B2 * | 8/2012 | Cluthe | ............... | B25G 1/085 81/439 |
| 8,413,549 B2 * | 4/2013 | Chen | ............... | B25B 15/04 81/439 |
| 9,427,861 B2 * | 8/2016 | Reynolds | ............... | B25G 1/085 |
| 10,926,400 B2 * | 2/2021 | Brull | ............... | B23Q 3/15706 |
| 11,065,694 B2 * | 7/2021 | Hartnagel | ............... | B23B 45/003 |
| 11,465,269 B2 * | 10/2022 | Brull | ............... | B25F 5/029 |
| 2001/0006014 A1 * | 7/2001 | Cowart | ............... | B25F 1/04 81/437 |
| 2016/0031068 A1 * | 2/2016 | Ma | ............... | B25B 23/10 81/57.36 |
| 2016/0214239 A1 * | 7/2016 | Jiang | ............... | B25B 23/12 |
| 2016/0263737 A1 * | 9/2016 | Cluthe | ............... | B25F 1/02 |

FOREIGN PATENT DOCUMENTS

| | | | | |
|---|---|---|---|---|
| EP | 2570239 A1 * | 3/2013 | ......... | B23Q 17/2442 |
| GB | 2320921 A * | 7/1998 | ............ | B25H 3/003 |
| JP | 2003245865 A * | 9/2003 | ............ | B25B 21/02 |
| NL | 9300477 A * | 10/1993 | ............... | B25F 1/04 |
| WO | WO-0009295 A1 * | 2/2000 | ............ | B25F 5/029 |
| WO | WO-03074236 A1 * | 9/2003 | ............... | B25F 1/04 |
| WO | WO-2011017796 A1 * | 2/2011 | ............ | B25B 15/02 |
| WO | WO-2020018122 A1 * | 1/2020 | ............... | B25F 1/02 |
| WO | WO-2023069360 A1 * | 4/2023 | ............ | B23B 47/28 |

* cited by examiner

LANYARD SYSTEM

CROSS-REFERENCE TO RELATED APPLICATIONS

This application is a Continuation-in-Part of U.S. application Ser. No. 15/090,261 filed Apr. 4, 2016. The aforementioned patent application is hereby incorporated by reference in its entirety into the present application to the extent consistent with the present application.

FIELD

The present disclosure relates generally to accessories for power tools. More particularly, the present disclosure relates to supporting and retaining a removable piece that is used with power tools, such as impact drivers, drills, hammer drills, nut spinners, impact wrenches, reciprocating saws, paint sprayers, sand blasters or water blasters. The present disclosure is a retracting lanyard for a drill bit, screw bit, socket driver, chisel, saw blade, or nozzle. In short, the novel lanyard system of the present disclosure stores, tethers, retains, extends and retracts a piece that is fixed in and removed from a tool. The piece is designed to perform a task such as, but not limited to tightening, loosening, drilling, chiseling, cutting, spraying or a combination thereof.

BACKGROUND

Tools with removable pieces are capable of performing a wider variety of tasks than those tools with fixed pieces. For example, a nut driver with removable sockets or a screwdriver with removable screw bits are capable of tightening or loosening a wider variety of nuts, bolts or screws than a wrench or screwdriver with a fixed working end. In fact, a driver adapted to handle both sockets and screw bits can perform the task of tightening and loosening both nuts, bolts and screws without the need for a toolbox of wrenches and screw drivers. The same can be said for power tools and sprayers configured with a piece receiver, such as a chuck or quick-change coupler. However, the challenge arises in keeping track of the multiple pieces to be placed in the piece receiver (chuck or quick-change coupler). Another challenge is quick and easy accessibility to multiple pieces.

Olson's tool caddy, U.S. Pat. No. 4,508,221, provides a solution to these challenges by mounting a flat sheet of flexible material having a plurality of parallel spaced apart longitudinal corrugated piece receiving pockets on the upper surface of the base sheet. A layer of pressure sensitive adhesive covers the bottom surface of the base sheet for attachment to a tool housing. Hibbard's strap on drill paraphernalia holding system, U.S. Pat. No. 4,797,040, provides a solution to these challenges by attaching a holding device directly to the motor or handle of an electric tool, allowing the user to store the drill paraphernalia needed for a particular job on the tool. Chen's multipurpose handle for holding electric tools, U.S. Pat. No. 4,820,090, provides a solution to these challenges by storing drill heads around the periphery of a handle to be attached to a drill. Yet none of the references discussed above provide for a means to tether the pieces to the tool.

Olsen's holder for a drill chuck key, U.S. Pat. No. 4,558,495, provides a string and connector to tether a drill chuck to the electric cord of a hand drill. And Krohn's drill chuck key, U.S. Pat. No. 4,997,194 provides for a chain and connector to tether a drill chuck to the hand drill. While such tethers are suitable for tethering a chuck key, none are suitable for use with a piece, like a screw bit, that is mounted in the piece connector. The problem being that the tethers disclosed are of fixed length and must be manually guided or positioned to remain clear of the tool's work area around the piece connector. In short, the tethers as described above have a tendency to obstruct the: work to be performed; the piece; piece connector; or the tool itself when the tool is operated. In certain situations, such a tether could become entangled with the piece, piece connector or the tool itself resulting in unsafe conditions.

The present disclosure provides for a low-cost lanyard system to store and manage through the use of a retractable strap or tether one or a plurality of pieces to be used with a tool. The lanyard system of the present disclosure can be incorporated into a tool as it is manufactured or added to a tool as an after-market product. Importantly it is not in itself a tool, but an add-on to many existing tools. The present disclosure provides a low-profile lanyard system allowing easy location and selection of the desired tethered piece from a storage position outside of a tool and move a tethered piece into a piece receiver (like a chuck or quick-change coupler) with little or no need to tend the lead of the tether into and about the work area of the tool. The present disclosure further provides a lanyard system in which a piece or plurality of pieces remains safely tethered to the tool even when mounted in a piece receiver (like a chuck or quick-change coupler). The present disclosure further provides a lanyard system with a retraction system capable of retrieving and storing a tethered piece once released from a piece receiver or the work region with little or no intervention by a user.

BRIEF SUMMARY

The present disclosure is a novel lanyard system for a piece that is securely connected to and detached from a tool by a piece receiver that includes a lanyard assembly with a two ended strap and a retraction system fixed to the tool in a storage region of the tool. In particular, the first end of the strap is connected to the piece and the second end of the strap is connected to one end of the retraction system. The other end of the retraction system is connected to the outside of the tool. The strap is of sufficient length for the retraction system to retract a piece to the storage region after disconnection from the piece receiver. It is contemplated that the retraction system includes at least one spring (coil or helical) assembly to cause the lanyard system to remain under tension while the piece is mounted in a piece receiver, thereby preventing or at least reducing the strap from interfering with the task at hand, the piece, the piece receiver or tool itself. The retraction system has sufficient tensional force to cause the retraction of a piece to the storage region once released from the piece receiver or work region of the tool.

BRIEF DESCRIPTION OF THE SEVERAL VIEWS OF THE DRAWINGS

FIG. 3 depicts each housing assembly 50 with a housing 502 having a slot 5022 and a tray 504 having a piece stop 5042 and a magnet 5044 to arrest and hold a piece 20 in tray 504.

FIG. 4 depicts each housing 502 having a slot 5022 and a tray 504 with a piece stop 5042 and a magnet 5044, all of which are fixed to a mount assembly 60 having a harness 602 with pads 604 and couplers 606.

FIG. 6 depicts certain elements of a retraction cartridge 401 with a coil spring assembly 406 including but not limited to an anchor cap 404, coil spring housing 4042, sleeve 501, lanyard assembly 30, piece connector 302, strap 304, strap first end region 3044, retainer assembly 3022, tab 3024 and piece 20.

FIG. 7 depicts certain elements of a retraction cartridge 401 with a coil spring assembly 406 including but not limited to an anchor cap 404, coil spring housing 4042, sleeve 501, piece connector 302, retainer assembly 3022, tab 3024 and piece 20.

FIG. 8 depicts certain elements of a retraction cartridge 401 with a coil spring assembly 406 including but not limited to an anchor cap 404, coil spring housing 4042, coil spring 4062, terminator 4064, sleeve 501, lanyard assembly 30, strap 304, piece connector 302, strap coupler 3042, strap first end region 3044, tab 3024 and piece 20 in the form of a driver bit.

FIG. 9 depicts certain elements of a retraction cartridge 401 with a helical spring assembly 408 including but not limited to an anchor cap 404, a lanyard assembly 30, a helical spring assembly 4081, strap coupler 3042, piece connector 302, strap 304, tab 3024, and piece 20 in the form of a reciprocating saw blade. Helical spring assembly 4081 is fixed at one end to an anchor cap 404 and to a strap coupler 3042 at the opposite end.

FIG. 10 depicts certain elements of a retraction cartridge 401 with a helical spring assembly 408 including but not limited to a stop cap 402, lanyard assembly 30, a helical spring 4081, strap coupler 3042, piece connector 302, strap 304 and piece 20 in the form of a nozzle for a paint sprayer. Strap 304 passes through a stop cap 402 and a helical spring 4081 and connects at one end of a helical spring 4081 by a strap coupler 3042.

FIG. 11 depicts certain elements of a retraction cartridge 401 with a helical spring assembly 408 including but not limited to an anchor cap 404, stop cap 402, lanyard assembly 30, a helical spring assembly 4081, strap coupler 3042, piece connector 302, strap 304, tab 3024, retainer assembly 3022 and piece 20 in the form of a nozzle for a socket driver. Strap 304 passes through a stop cap 402 and a portion of helical spring 4081 and connects by a strap coupler 3042 to helical spring 4081 at a point between the ends of helical spring assembly 4081.

FIG. 12 depicts certain elements of a retraction cartridge 401 with a nested spring assembly 4082 including but not limited to a piece 20, piece shoulder 202, groove 204, lanyard assembly 30, piece connector 302, retainer assembly 3022, strap 304, strap coupler 3042, first strap end region 3044, second strap end region 3046, stop cap 402, anchor cap 404, inner spring 40822, outer spring 40824, first and second end regions of the inner spring and outer springs 408222, 408224, 408242, 408244.

The use of strap couplers 3042 as shown in FIGS. 9, 10, 11, and 12 enables the connection or disconnection of straps from retraction systems without removing the retraction system.

Figure 13:
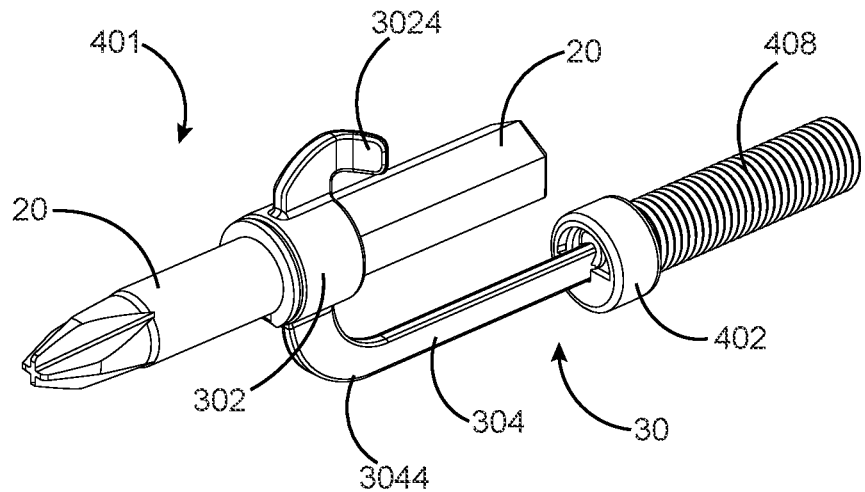

FIG. 13 is a detailed perspective view of a tabbed embodiment of a lanyard assembly 30 connected to a helical spring assembly 408 embodiment of a retraction cartridge 401. In particular, FIG. 13 depicts certain elements including but not limited to a piece 20, piece connector 302, tab 3024, strap 304, strap first end region 3044 and stop cap 402.

Figure 14:
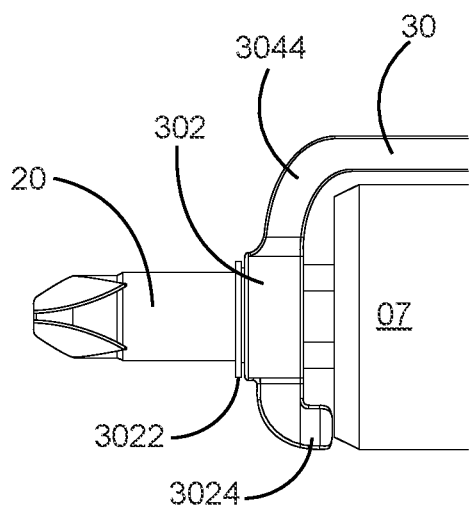

FIG. 14 is a detailed side view of a tabbed embodiment of a lanyard assembly 30 connected to a piece 20 depicting certain elements including but not limited to a retainer assembly 3022 and a strap first end region 3044 terminating in a piece connector 302 with a tab 3024 extending toward a piece receiver 07.

Figure 15:
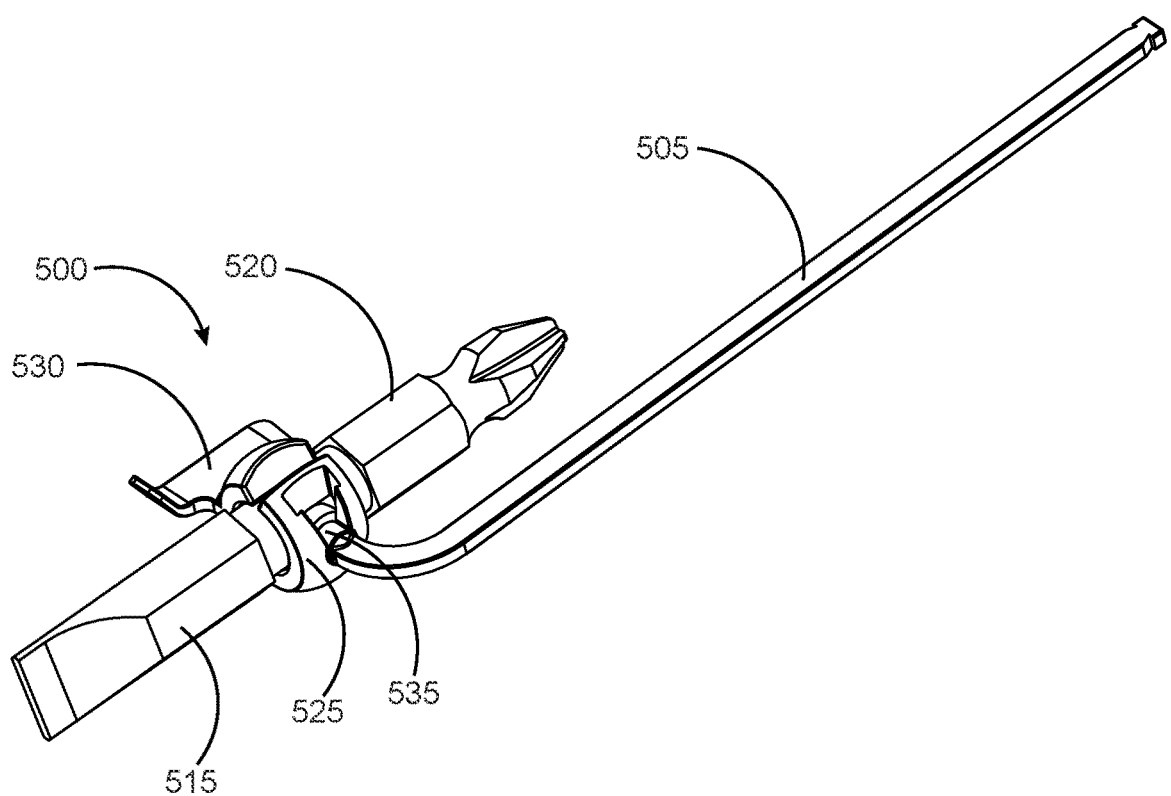
Figure 16:
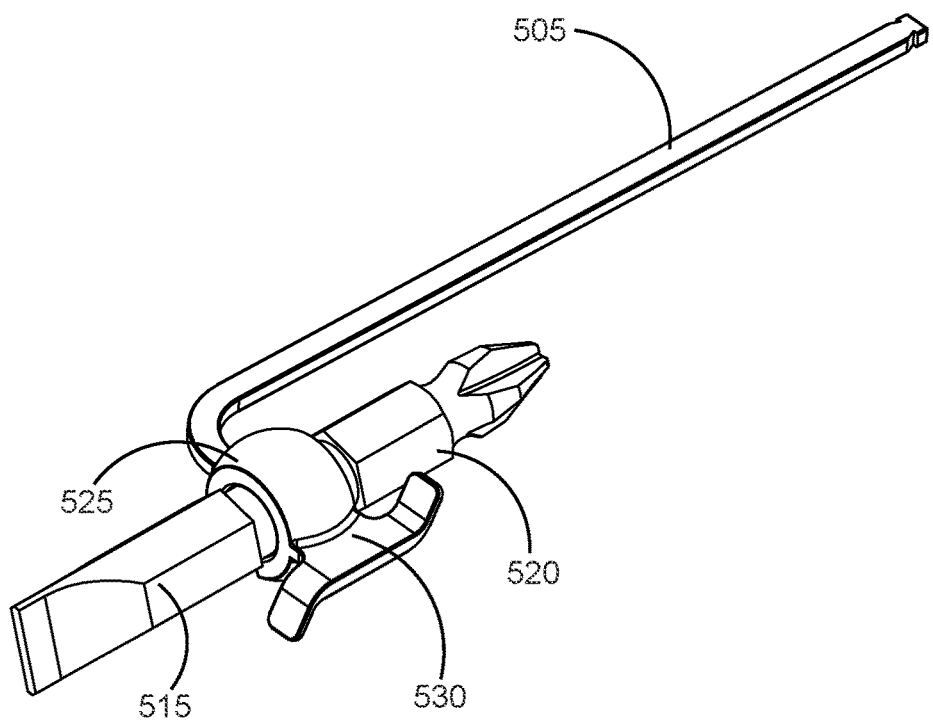

FIGS. 15 and 16 is a detailed view of an additional embodiment in which a pivoting bit lanyard assembly is configured to replace any of the pieces 20 in the other Figures to provide additional options of bits (pieces) to the user by the use of a pivoting two-part bit piece (pieces 515 and 520) which can supply two different pieces to the user on each lanyard assembly and the user only has to pull out the lanyard from its storage place on the outside of the tool and pivot the pivoting two-part bit piece around the pivot point 535 to use the preferred piece.

DETAILED DESCRIPTION OF THE PREFERRED EMBODIMENTS

Figure 1:
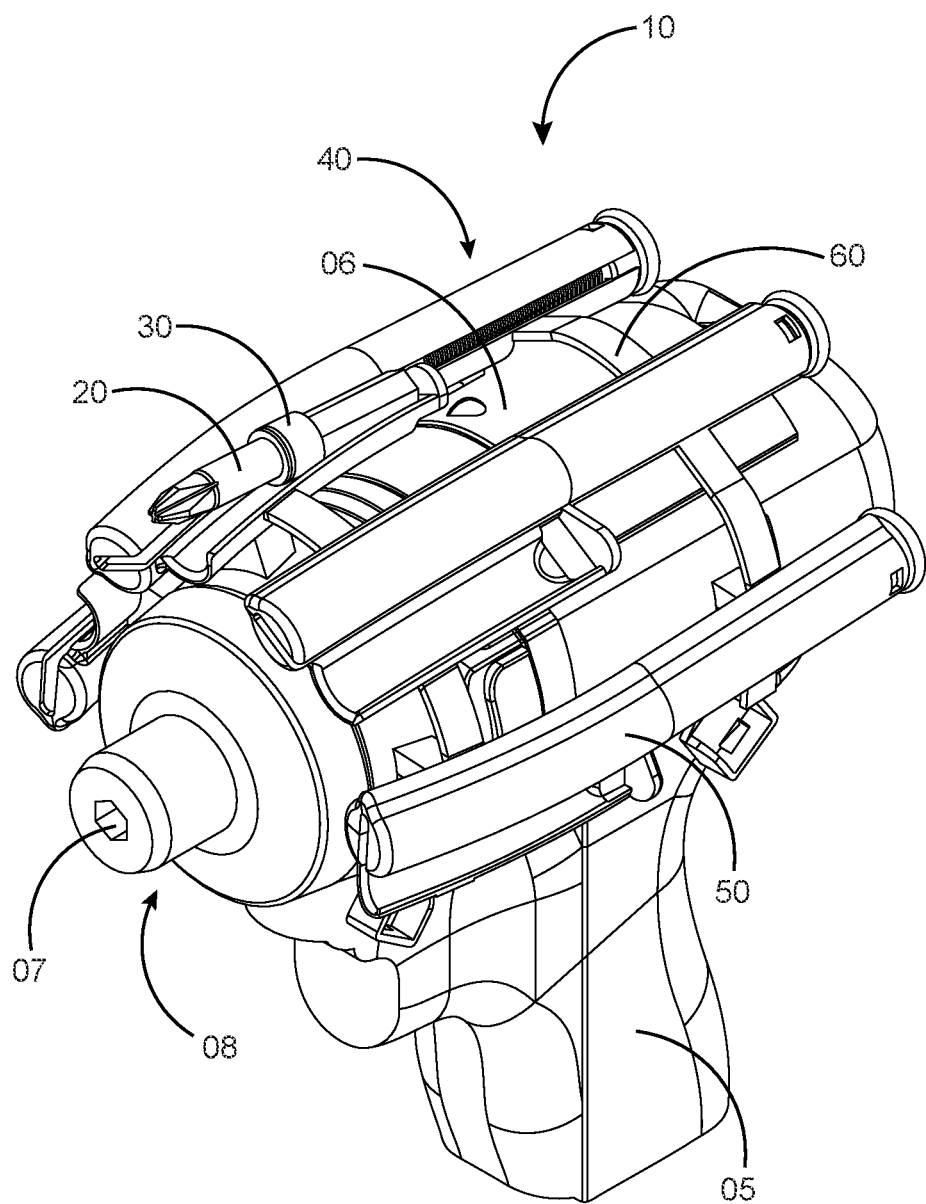
FIG. 1 is a perspective view of a lanyard system 10 mounted on a power tool 05 with a storage region 06 (the area surrounding and outside the tool), piece receiver of the power tool 07 and work region 08 depicting certain elements including but not limited to a piece 20 connected to a lanyard system 30 fixed to a retraction system 40 positioned in a housing assembly 50 fixed to a storage area 06 completely outside of the power tool by a mount assembly 60. A variety of mount assemblies are possible.

A lanyard system 10 for a piece 20 or a number of pieces 20, like a bit, should be attached to a tool 05, like an impact driver, in such a way that each piece 20 on one hand is capable of being easily inserted and used in a piece receiver 07, like a quick release connector, and on the other hand easily removed and positioned in a storage region 06 for future use. See FIGS. 1 and 2. This can be achieved for each piece 20 by attaching a piece 20 to a lanyard assembly 30 that in turn is connected to a retraction system 40. See FIGS. 1 and 2. While the following description sometimes focuses upon a lanyard system 10 with only one piece 20, the details are applicable to a lanyard system 10 with a plurality of lanyard assemblies with different pieces 20.

It is contemplated that tool 05 can be powered manually, electrically, pneumatically, hydraulically or a combination thereof. By illustrative example, tool 05 could be an impact driver, drill, hammer drill, nut spinner, impact wrench, reciprocating saw, paint sprayer, sand blaster or water blaster. Piece 20 could be drill bit, screw bit, socket driver, chisel, saw blade, or nozzle. In short, piece 20 is an object removably fixed in a tool to perform a task such as, but not limited to tightening, loosening, drilling, chiseling, cutting or a combination there. In a preferred embodiment, piece 20 is an object with radial symmetry that can be positioned in a piece receiver 07 and used in conjunction with tool 05 to accomplish a task, such as the ones described above. Pieces 20 with a radial symmetry include but are not limited to Phillips bit, Robertson bit, hex bit, 12 point flange bit, hex socket bit, security hex socket bit, Torx bit, security Torx bit, tri-wing bit, torq-set bit, spanner head bit, clutch bit, one-way bit, double-square bit, triple square bit, polydrive bit, spline drive bit, double hex bit, Bristol bit, pentalobe bit, socket bit, drill bit, spiral cutting bit, cut off disc bit, drum sanding bit and/or a combination thereof. In another preferred embodiment, piece 20 is a chisel, saw blade or other object used in conjunction with tool 05 to accomplish tasks such as removing or cutting material. In yet another preferred embodiment, piece 20 is a nozzle used in conjunction with a tool 05 to accomplish tasks such as sand blasting or painting.

Figure 5:
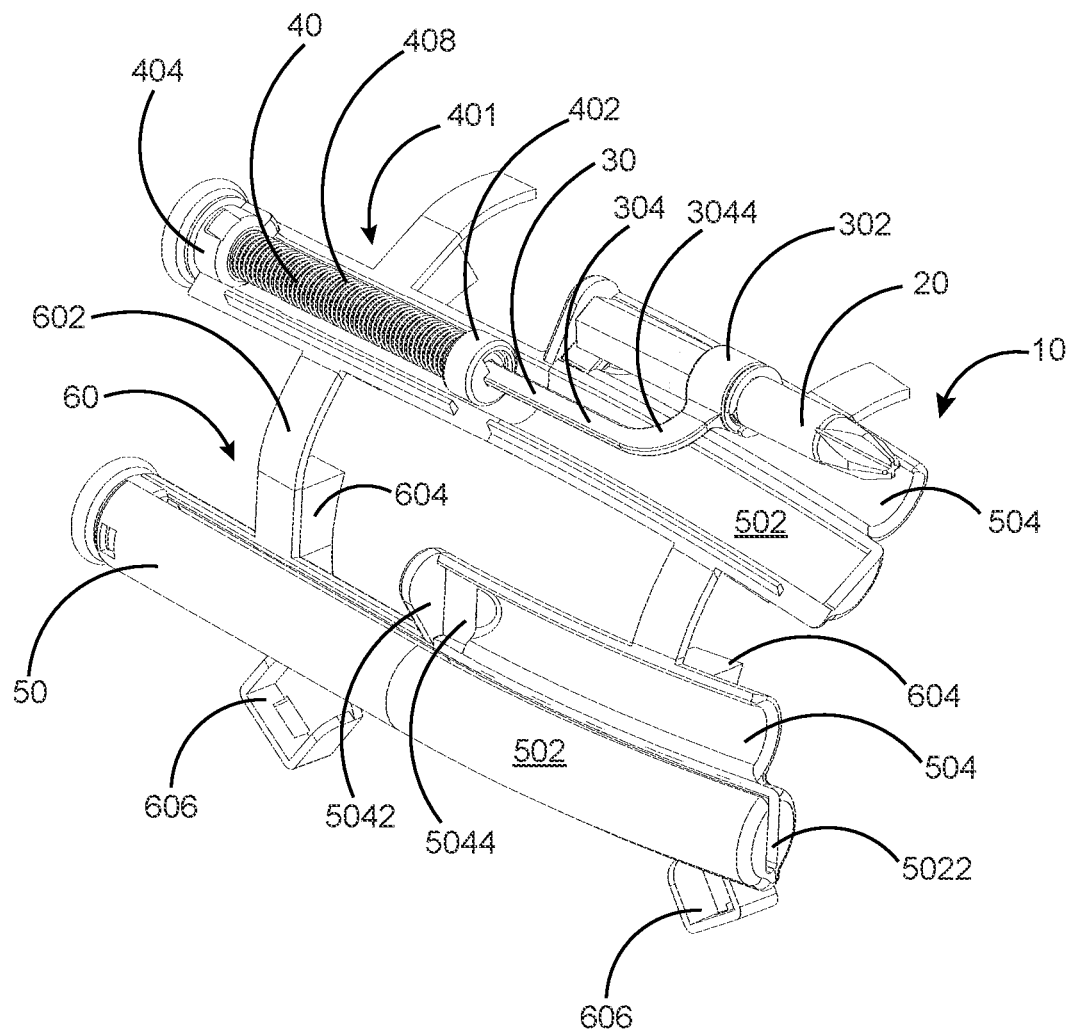
FIG. 5 is a detailed perspective view of a lanyard system 10 with a portion of a housing assembly 50 removed to depict certain elements of a lanyard assembly 30, retraction assembly 40, housing assembly 50 and mount assembly 60, including but not limited to a piece 20, piece connector 302, a strap 304, a strap first end region 3044, a retraction cartridge 401, stop cap 402, anchor cap 404, helical spring assembly 408, housing 502, slot 5022, tray 504, piece stop 5042, magnet 5044, harness 602, pads 604, and couplers 606.
Figure 6:
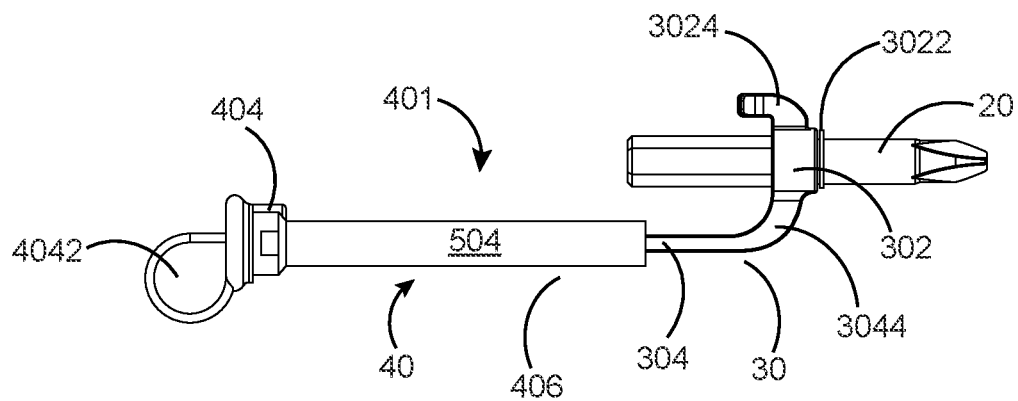
FIG. 6 is a side view of a retraction cartridge 401 of a retraction system 40 used in a piece lanyard system 10.
Figure 7:
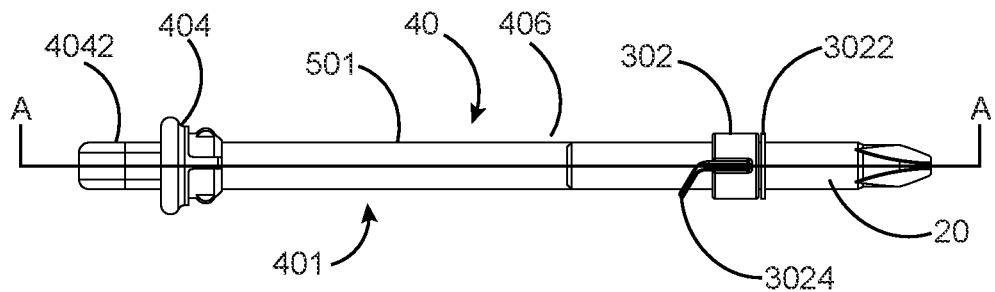
FIG. 7 is a top view of a retraction cartridge 401 of a retraction system 40 used in a piece lanyard system 10.
Figure 8:
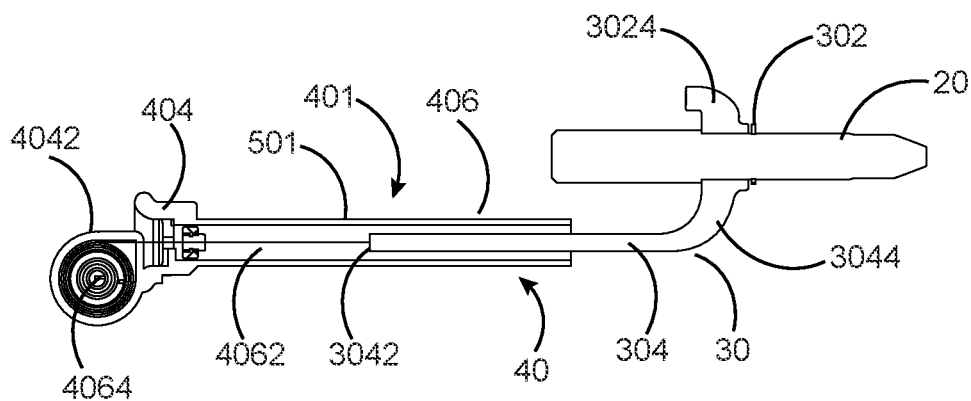
FIG. 8 is a cross sectional view of a retraction cartridge 401 of a retraction system 40 used in a piece lanyard system 10.
Figure 9:
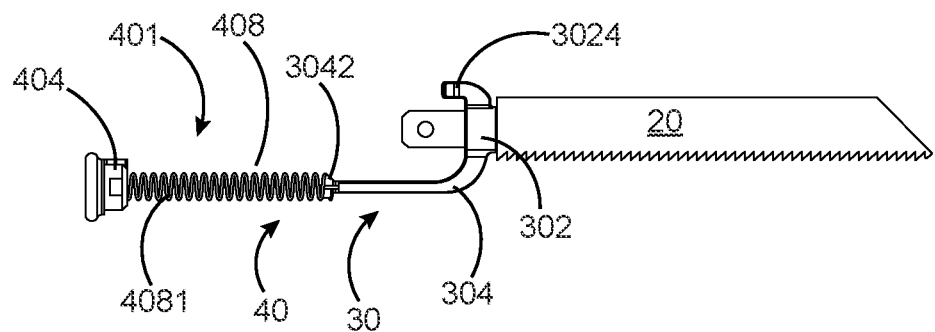
FIG. 9 is a side view of a retraction cartridge 401 of a retraction system 40 used in a piece lanyard system 10.
Figure 10:
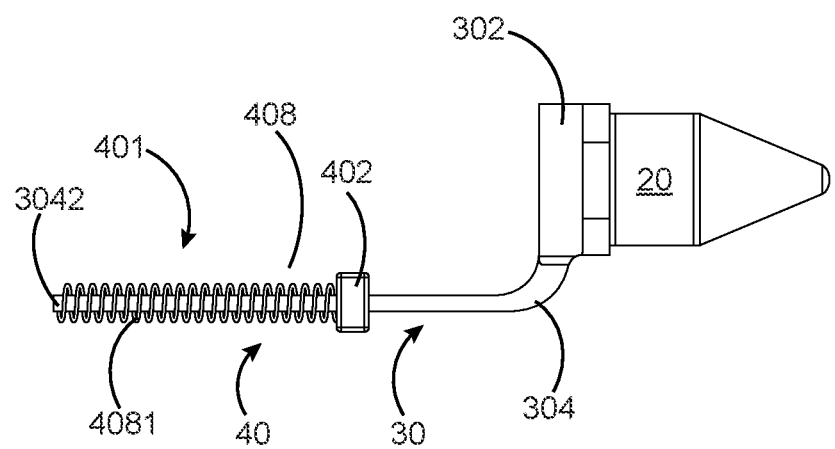
FIG. 10 is a side view of a retraction cartridge 401 of a retraction system 40 used in a piece lanyard system 10.
Figure 11:
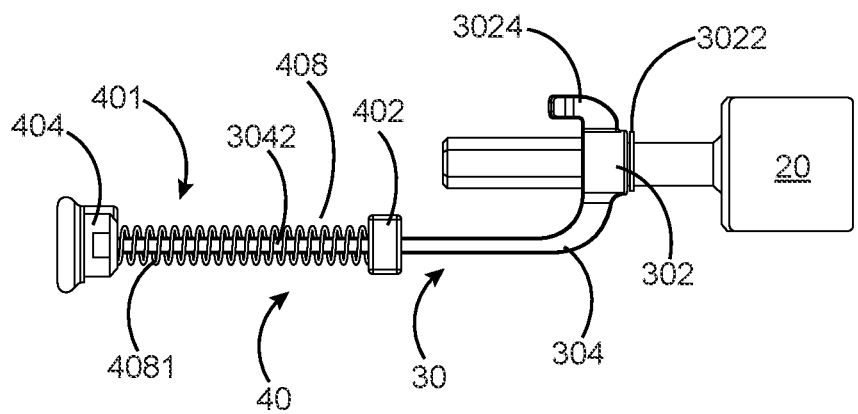
FIG. 11 is a side view of a retraction cartridge 401 of a retraction system 40 used in a piece lanyard system 10.
Figure 12:
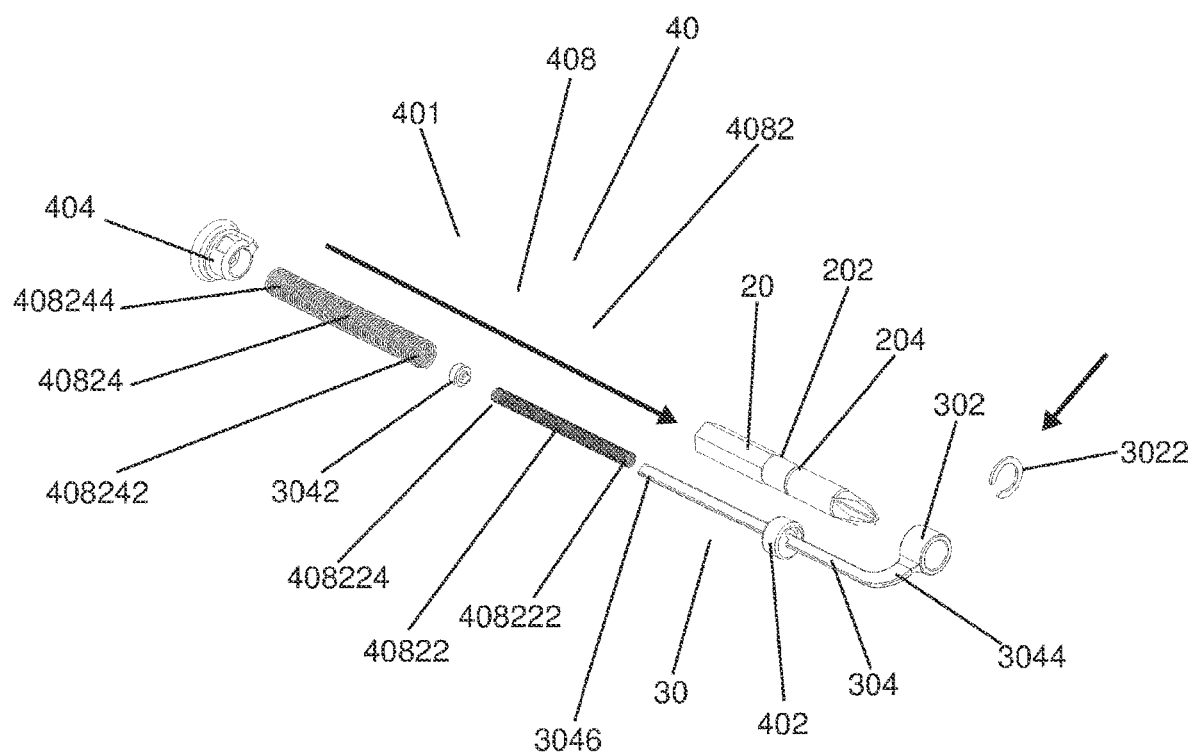
FIG. 12 is an exploded view of a retraction cartridge 401 of a retraction system 40 used in a piece lanyard system 10.

Turning to the lanyard assembly 30, a strap 302 with two end regions 3044, 3046 is connected at a first end region 3044 to a piece 20 and connected at a second end region 3046 to a retraction system 40. See FIGS. 1, 2 and 5. Lanyard assembly 30 is of sufficient length for retraction system 40 to retract a piece 20 to a storage region 06 after disconnection from piece receiver 07. See FIGS. 1, 2 and 5.

In a preferred embodiment, a piece connector 302 is disposed and fixed between a strap first end region 3044 and piece 20 to allow piece 20 to be connected to or disconnected from a retraction system 40. See FIGS. 6 -12 and 14. Such a feature is useful when a piece 20 requires replacing because it is worn or a different piece 20 is required for the task at hand.

Piece connector 302 can be a collar, clamp, or other types of connector known to those in the fastening industry. A preferred embodiment of piece connector 302 is a collar with at least one retainer 3022 fixed on piece 20 with a shoulder 202. See FIG. 12. When piece 20 is a bit or similar object with radial symmetry, it is contemplated that piece 20 passes through collar 302 and is held in collar 302 by a shoulder 202 formed in piece 20 on one side of collar 302 and a retainer 3022 on the other side of collar 302. See FIG. 12. Retention of piece 20 can be enhanced by a groove 204 being formed in piece 20 to hold retainer 3022. See FIG. 12. Likewise, if piece 20 does not have a shoulder, then piece 20 can be held in collar 302 by at least two opposing retainers 3022 with or without corresponding grooves 204. In a preferred embodiment, longitudinal movement of piece 20 in collar 302 is determined by the distance between retainers 3022 and/or piece shoulder and another retainer 3022. This becomes critical in those embodiments of a lanyard system 10 that contemplate tool 05 reciprocating piece 20—such as a saw blade. In yet another embodiment of a lanyard system 10 that contemplates no rotation, reciprocation or a combination thereof of a piece 20, then piece connector 302 can be a clamp to connect piece 20 to lanyard assembly 30. Such an embodiment is applicable where the piece 20 is a nozzle. Regardless of its form, it is contemplated that piece connector 302 is constructed of a durable material and configured to transmit a force through strap 304 to extend a retraction system 40. In a preferred embodiment, piece connector 302 is constructed and configured to withstand or at least reduce wear due to rotation and/or reciprocation of a piece 20 by tool 05. Such durable material includes but is not limited to plastic or metal.

In a preferred embodiment of a lanyard system 10, a tab 3024 is fixed to strap first end region 3044 and positioned to selectively engage a piece receiver 07 to eject or at least assist in the removal of piece 20 from piece receiver 07. In another preferred embodiment, tab 3024 is fixed to piece connector 302 to eject or at least assist in the removal of piece 20 from piece receiver 07. See FIGS. 13 and 14.

The length of strap 304 should be sufficient to allow retraction system 40 to retract piece 20 to a storage region 06 after disconnection from a piece receiver 07 and/or release in a work region 08 of tool 05. See FIGS. 1, 2, 5, and 8. The length of strap 304 is dependent upon the location of storage region 06 in relation to the position of retraction system 40 and the piece receiver 07 as well as the attachment location of strap 304 to retraction system 40. Strap 304 can be a cord, thong wire, cable or a combination thereof constructed of a durable material. Such durable material includes, but is not limited to plastic, metal, resilient materials or a combination thereof. It is contemplated that a cross section of strap 302 can be circular, arcuate, polygonal or a combination thereof. In a preferred embodiment, strap 304 has a rectangular cross section and is constructed from a stiff plastic with minimal flex and stretch. In another embodiment, strap 304 has a circular cross section and is constructed of metal with sufficient flexibility to make a loop without kinking the metal.

In a preferred embodiment, retraction system 40 comprises at least one coil spring assembly 406 fixed in a coil spring housing 4042 mounted to a housing assembly 50 by an anchor cap 404. See FIGS. 6, 7 and 8. A coil spring 4062 is fixed at one end to a terminator 4064 and bias coiled about itself and passes through anchor 404 into sleeve 501. The other end of coil spring 4062 is attached to a lanyard assembly 30 by a strap coupler 3042. See FIG. 8. As described above, lanyard assembly 30 is attached to a piece 20. Retraction of piece 20 to a storage region 06 occurs when piece 20 is released from piece receiver 07 and/or work region 08 and coil spring 4062 is allowed to retract and coil back into the coil spring housing 4042.

In a preferred embodiment, retraction system 40 comprises at least one helical spring assembly 408 fixed at one end to an anchor cap 404 and fixed at an opposing end to a lanyard assembly 30 that is further fixed to a piece 20 thereby forming a retraction cartridge 401. See FIGS. 9, 10, 11 and 12. In one embodiment of retraction cartridge 401, strap 304 is attached to a helical spring end region that is proximal to piece 20 and an opposing helical spring end region is fixed to a storage region 06 by anchor cap 404. See FIG. 9. In such a configuration, helical spring 4081 extends away from its anchored end region to move piece 20 into a work region 08 and/or piece receiver 07 of tool 05. Retraction of piece 20 to a storage region 06 occurs when piece 20 is released from piece receiver 07 and/or work region 08 and helical spring 4081 contracts to its normal length. In another embodiment, helical spring 4081 is fixed to a lanyard assembly 30 such that strap 304 passes through helical spring 4081 and attaches to an end region of helical spring 4081 distal to piece 20. An opposing end region of helical spring 406, proximal to piece 20, attaches to a stop cap 402 which in turn is fixed to storage region 06 thereby allowing helical spring 4081 to compress against stop cap 402 to move piece 20 into work region 08 and/or piece receiver 07. See FIG. 10. Retraction of piece 20 to a storage region 06 occurs when piece 20 is released from piece receiver 07 and/or work region 08 and helical spring 4081 is allowed to extend to its normal length. In yet another embodiment of a retraction cartridge 401 with a helical spring assembly 408, strap 304 is fixed to a piece 20 at one end and fixed at an opposite end to a helical spring 4081 at a position between opposing ends of helical spring 4081 by a strap coupler 3042. See FIG. 11. One end of helical spring 4081 is fixed to a storage region 06 of tool 05 by an anchor cap 404 and opposing end of helical spring 4081 is fixed to a storage region 06 in proximity to work area 08 by stop cap 402. See FIG. 11. In such a configuration, helical spring 4081 simultaneously extends and contracts as piece 20 is pulled towards work region 08. Attachment of strap 304 at a point between the ends of helical spring 4081 allows the compressed portion of helical spring 4081 to prevent over extension of the remaining portion of helical spring 4081. Retraction of piece 20 to a storage region 06 occurs when piece 20 is release from piece receiver 07 and/or work region 08 and helical spring 4081 simultaneously extends and contracts to its normal length.

In a preferred embodiment of a lanyard system 10, retraction cartridge 401 includes a helical spring assembly 408 with a nested spring assembly 4082 which comprises at least one inner spring 40822 nested within an outer spring 40824. See FIG. 12. Outer spring 40824 first end 408242 is fixed to a stop cap 402. See FIG. 12. Outer spring 40824 second end 408244 is fixed to an anchor 404 which is fixed in storage region 06. A strap 304 releasably connects at a strap first end region 3044 to a piece 20. Strap 304 extends through stop cap 402 and inner spring 40822, and strap second end region 3046 is fixed to inner spring second end 408224. In another embodiment, strap second end region 3046 connects to inner spring second end 40824 by a releasable strap coupler 3042. See FIG. 12. Such a configuration allows lanyard assembly 30 to be disconnected from retraction cartridge 401. In the nested spring assembly 4082, strap 304 is pulled towards work region 08 causing inner spring 40822 to compress against stop cap 402 therein causing outer spring 40824 to extend as piece 20 is moved towards and positioned in piece receiver 07. It is further contemplated that with a nested spring assembly 4082, one or more inner springs 40822 can be nested within outer spring 40824. Multiple inner springs 40822 can be nested within each other (nest within a nest) or positioned end to end with each other.

Regardless of which embodiment of retraction system 40 is used within a lanyard system 10, the force required to extend and/or compress a coil spring assembly 406 or helical spring assembly 408 can be varied to achieve the desired force required to move a piece 20 between storage region 06 and work region 08. Variation of force can be the result of utilizing different materials, windings, and/or spring shapes. It is contemplated that materials conducive to spring construction would be incorporated into the present disclosure. Likewise, traditional spring windings and shapes, coil or helical, are contemplated in the construction of a retraction system 40. The variations in construction materials, winding, spring shapes and/or spring arrangements allow the desired results to be achieved. In certain circumstances the desired result is a constant retraction rate over the travel range of piece 20 between storage region 06 and work region and/or piece receiver 07. In other circumstances the desired result is a retraction rate that varies depending upon where a piece 20 is located. For example, while piece 20 is within a work region 08, the retraction rate can be faster than the retraction rate while the piece is in or approaches the storage region 06.

Figure 3:
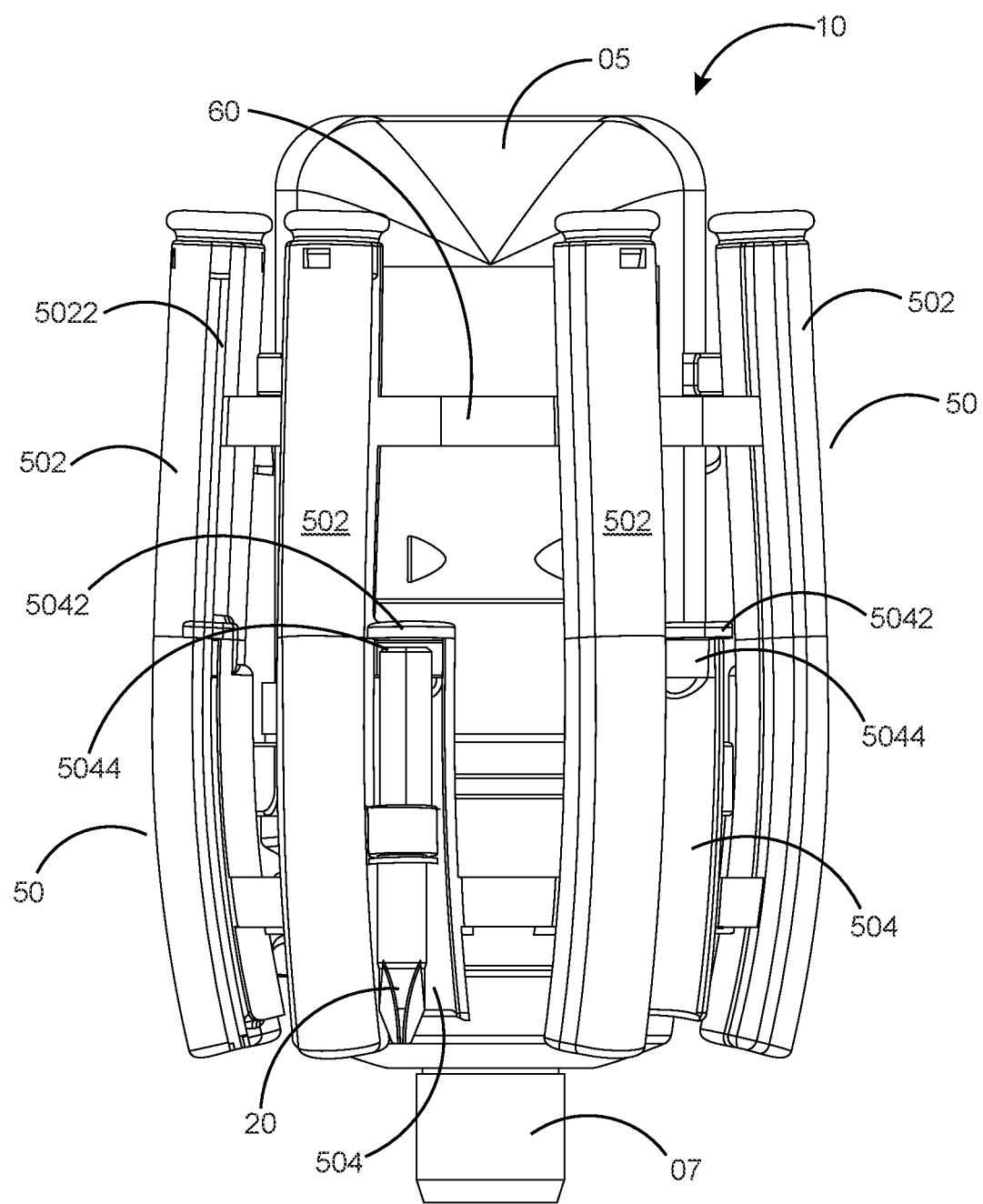
FIG. 3 is a top view of a lanyard system 10 fixed to a tool 05 with a piece receiver 07 depicting certain elements including but not limited to a plurality of housing assemblies 50 fixed to a mount assembly 60.
Figure 4:
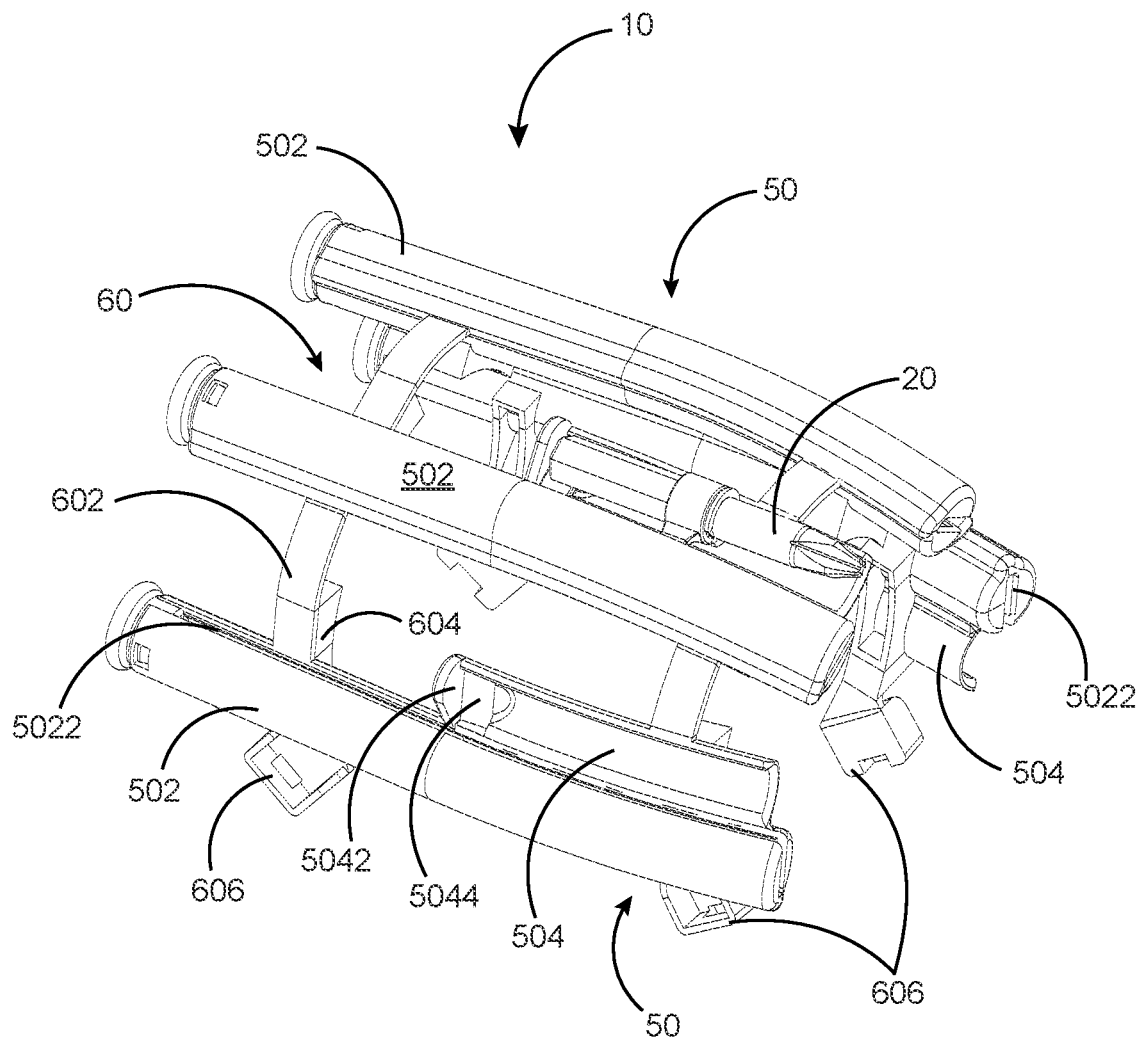
FIG. 4 is a perspective view of a lanyard system 10 depicting certain elements including but not limited to a plurality of housing assemblies 50 fixed to a mount assembly 60.

In a preferred embodiment of lanyard system 10, a retraction cartridge 401 is positioned within a housing assembly 50 for containment and protection. See FIGS. 1, 2, 3, 4 and 5. Housing assembly 50 includes a housing 502 that is of sufficient length to hold at least a portion of an extended coil spring assembly 406 or extended helical spring assembly 408. In a preferred embodiment, a slot 5022 is formed in housing 502 along its length to allow lanyard assembly 30 to move freely as retraction system 40 extends or retracts piece 20 between storage region 06 and work region 08 and/or piece receiver 07. See FIGS. 3, 4 and 5. In a preferred embodiment, housing 502 releasably connects to an anchor cap 404. See FIGS. 3, 4, 5, 6, 7, 8, 9, 10, 11 and 12. It is further contemplated that in such a preferred embodiment, retraction cartridge 401 is easily removed from housing 502. This preferred embodiment further allows the easy replacement of a piece 20, lanyard assembly 30, retraction assembly 40, retraction cartridge 401 or a combination thereof. It is contemplated that housing 50 is constructed of a durable material such as plastic or metal suitable for containing and protecting a retraction cartridge 401.

In a preferred embodiment of housing assembly 50, a tray 504 is fixed to a storage region 06 in close proximity to housing 502. See FIGS. 3, 4 and 5. Tray 504 is configured to receive and guide a piece 20 to a resting place in storage area 06, outside the tool 05. In a preferred embodiment of tray 504, at least one magnet 5044 is fixed in tray 504 to releasably hold piece 20. See FIGS. 3, 4 and 5. In another embodiment of tray 504, a piece stop 5042 is fixed to an end region of tray 504 that is distal to work region 08. See FIGS. 3, 4 and 5. Piece stop 5042 prevents piece 20 from travelling beyond tray 504. It is contemplated that tray 504 and piece stop 5042 are constructed from a durable material, such as plastic or metal suitable to guide and hold a piece 20 in storage area 06.

Figure 2:
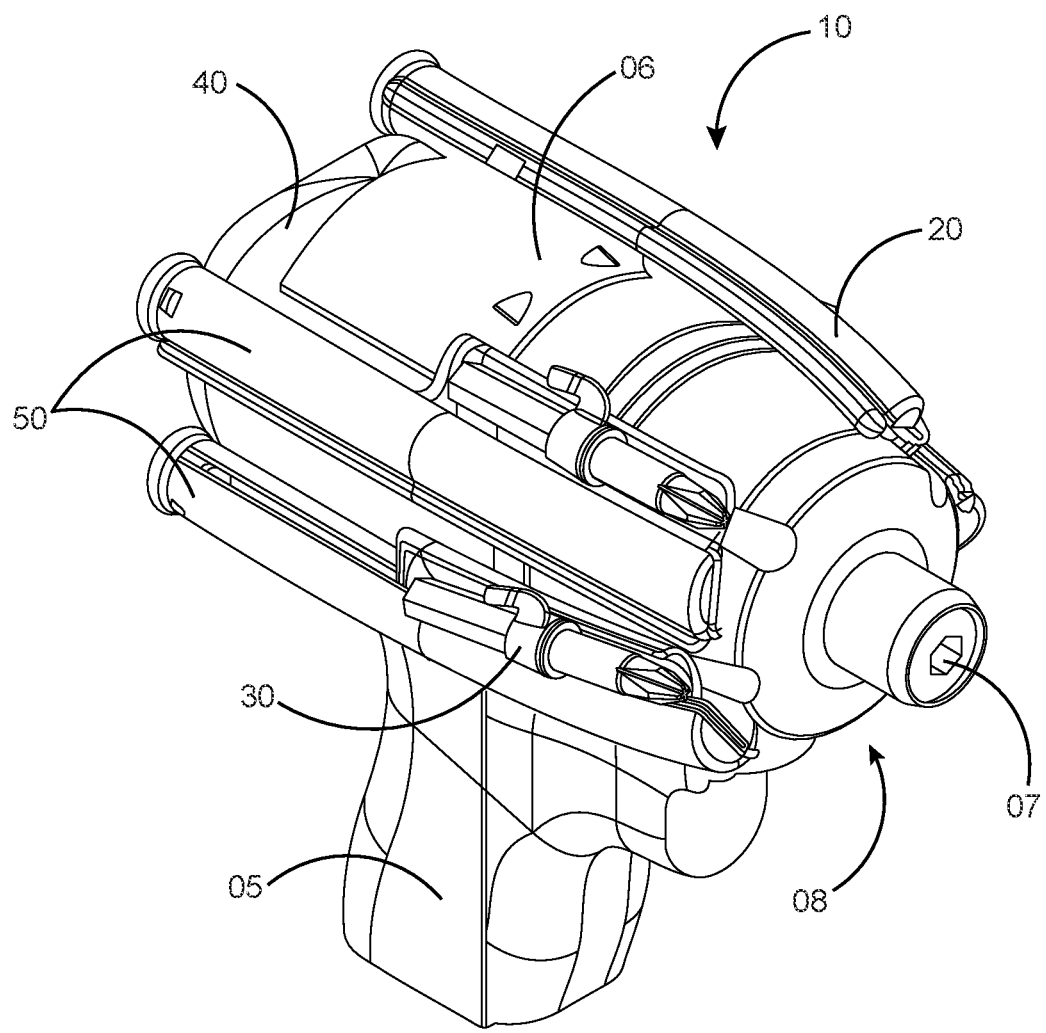
FIG. 2 is a perspective view of a lanyard system 10 fixed to a power tool 05 with a storage region 06 (the area surrounding and outside the tool), piece receiver of the power tool 07 and work region 08 depicting certain elements including but not limited to a piece 20 connected to a lanyard system 30 fixed to a retraction system 40 positioned in a housing assembly 50 integral with tool 05 in its storage area 06 completely outside of the power tool. The term integral with the tool means that a tool manufacturer could provide connections built into the tool that make it possible to snap on the needed individual housing assemblies that surround each retraction system rather than a strap mounting assembly to hold the housing assemblies in place.

In a preferred embodiment of lanyard system 10, retraction system 40 is fixed to an exterior surface of tool 05 by a mount assembly 60. See FIGS. 1, 4 and 5. In such an embodiment, mount assembly 60 includes at least one pad 604 disposed between tool 05 and a harness 602. See FIGS. 4 and 5. Harness 602 is securely fixed to tool 05 by at least one coupler 606. See FIGS. 4 and 5. In a preferred embodiment, harness 602 wraps around the exterior of a tool 05 and is secured to tool 05 by opposing couplers 606. See FIGS. 4 and 5. Harness 602 is configured to hold at least one retraction system 40 or housing assembly 50 in a storage area 06. In a preferred embodiment, harness 602 is configured to hold a plurality of retraction systems 40, housing assemblies or a combination thereof around the exterior of tool 05. See FIGS. 1, 4 and 5. In a yet another embodiment, housing assembly 50 is integral with said tool. See FIG. 2. The term integral with the tool means that a tool manufacturer could provide connections built into the tool that make it possible to snap on the needed individual housing assemblies that surround each retraction system. Note that FIG. 2 shows no harness or mount assemblies.

FIGS. 15, 16 represents a detailed view of an additional embodiment in which a two-part pivoting bit lanyard assembly 500 is configured to replace any of the pieces 20 in other FIGS. (1, 2, 3, 4, 5, 6, 7, 8, 9) to provide additional options of bits (pieces) to the user by the use of a pivoting two-part (515, 520) piece which can supply two different pieces to the user on each pivoting bit lanyard assembly and the user only has to pull the pivoting bit lanyard assembly away from the retraction system and to then pivot the pieces around the pivot point 535 after pulling it out to use the preferred piece by placing it in the piece receiver on the tool. This effectively doubles the pieces available to the user for a given number of lanyard assemblies. The example shown in these two views in FIGS. 15 and 16 represents an example pivoting two-part piece in which one end 515 of the two-part piece is a slotted bit and the other end 520 is a Phillips bit. And this two-part piece pivots around a pivot 535 so that it can pivot 180 degrees. FIGS. 15 and 16 are the exact same entities but viewed from two different angles for clarity. The encircling piece connector 525, that surrounds the middle core of the dual bits is connected to the lanyard strap 505, again just as in FIGS. (1, 2, 3, 4, 5, 6, 7, 8, 9).

It should be noted that the particular example of the pivoting two-part piece in which one piece 515 is a slotted bit and the other 520 is a Phillips bit is just one of many combinations of two parts of a two-part piece. There are many possible pieces as described in this specification.

The present disclosure has been described with reference to specific details of particular embodiments. It is not intended that such detail be regarded as limitations upon the scope of the disclosure except insofar as and to the extent that they are included in the accompanying claims.

I claim:

1. A lanyard system for removable pieces connected to and detached from a tool by a piece receiver comprising:
   a. lanyard assemblies positioned outside the tool and each comprising a strap with two end regions: said first strap end region attached to the piece by a piece connector; and said second strap end region attached to a retraction system by a strap coupler disposed between said strap second end region and said retraction system to allow said strap to be connected to or disconnected from said retraction system;
   b. each retraction system also positioned outside the tool and comprising a spring assembly to maintain the lanyard system under tension while the piece is mounted in the piece receiver; a second end of the spring assembly is fixed to an anchor cap; said anchor cap is fixed to a housing assembly surrounding each said retraction system;
   c. each retraction system and each lanyard assembly configured to be fixed to the tool in an exterior storage region on the outside of the tool: wherein each strap is of sufficient length and configured for each retraction system to retract its corresponding piece to said exterior storage region after disconnection from the piece receiver of the tool.

2. The lanyard system as claimed in claim 1, wherein the spring assembly of each said retraction system is positioned outside the tool comprises at least one coiled spring fixed to said strap second end region and extended when said piece is positioned in or near the piece receiver.

3. The lanyard system as claimed in claim 1, wherein the spring assembly of each said retraction system positioned outside the tool comprises an outer spring and at least one inner spring to form a nested spring assembly, said strap second end region fixed to an innermost said inner spring; and said outer spring extended when said piece is positioned in or near the piece receiver.

4. The lanyard system as claimed in claim 1, wherein the spring assembly of each said retraction system positioned outside the tool comprises at least one helical spring fixed to said strap second end region and extended when said piece is positioned in or near the piece receiver.

5. The lanyard system as claimed in claim 4, wherein said first strap end region attached to the piece by a piece connector is attached to a reciprocating saw blade piece.

6. The lanyard system as claimed in claim 4, wherein said first strap end region attached to the piece by a piece connector is attached to a nozzle for a paint sprayer piece.

7. The lanyard system as claimed in claim 4, wherein said first strap end region attached to the piece by a piece connector is attached to a nozzle for a socket driver piece.

8. The lanyard system as claimed in claim 1, wherein each housing assembly surrounding each said retraction system is attached to the tool to contain and protect said retraction system.

9. The lanyard system as claimed in claim 1, further comprising housing assembly's integral with said tool to contain and protect each said retraction system.

10. The lanyard system as claimed in claim 1, further comprising a mount assembly to position said retraction system on said tool.

11. The lanyard system as claimed in claim 1, further comprising a tray fixed in said storage region to hold a piece in said storage region.

12. The lanyard system as claimed in claim 1, wherein said piece connector is disposed between said strap first end region and said piece to allow said piece to be connected to or disconnected from said retraction system.

13. The lanyard system as claimed in claim 1, wherein said strap coupler is releasably disposed between said strap second end region and said retraction system at said second end of the spring assembly to allow said strap to be connected to or disconnected from said retraction system.

14. The lanyard system as claimed in claim 1, further comprising a harness fixed between the tool and a plurality of said retraction systems to allow a plurality of pieces to be selectively extended to or retracted from the piece receiver by a corresponding retraction system.

15. The lanyard system as claimed in claim 1, wherein the lanyard assemblies positioned outside the tool and each comprising a strap with two end regions, have said first strap end region attached by a piece connector to a pivoting two-part bit piece which can supply two different pieces to the user on each lanyard assembly, doubling the number of pieces available to the user and said second said second strap end region is attached to said retraction system.

16. A method for providing a lanyard system for removable pieces connected to and detached from a tool by a piece receiver comprising:
   a. providing lanyard assemblies positioned outside the tool with each comprising a strap with two end regions: said first strap end region attached to the piece by a piece connector; and said second strap end region attached to a retraction system by a strap coupler disposed between said strap second end region and said retraction system to allow said strap to be connected to or disconnected from said retraction system;
   b. wherein each retraction system also positioned outside the tool provides a spring assembly to maintain the lanyard system under tension while the piece is mounted in the piece receiver, with a first end of the spring assembly fixed to a stop cap; a second end of the spring assembly fixed to an anchor cap; and said anchor cap is fixed to a housing assembly surrounding each said retraction system; and c. wherein each retraction system and each lanyard assembly configured to be fixed to the tool in an exterior storage region on the outside of the tool: and wherein each strap is of sufficient length and configured for each retraction system to retract its corresponding piece to said exterior storage region after disconnection from the piece receiver of the tool.

17. The method for providing a lanyard system for removable pieces connected to and detached from a tool by a piece receiver of claim 16 wherein the spring assembly of each said retraction system positioned outside the tool provides at least one coiled spring fixed to said strap second end region and extended when said piece is positioned in or near the piece receiver.

18. The method for providing a lanyard system for removable pieces connected to and detached from a tool by a piece receiver of claim 16 wherein the spring assembly of each said retraction system positioned outside the tool provides an outer spring and at least one inner spring to form a nested spring assembly, said strap second end region fixed to an innermost said inner spring; and said outer spring in extension when said piece is positioned in or near the piece receiver.

19. The method for providing a lanyard system for removable pieces connected to and detached from a tool by a piece receiver of claim 16 wherein the spring assembly of each said retraction system positioned outside the tool provides at least one helical spring fixed to said strap second end region and extended when said piece is positioned in or near the piece receiver.

20. The method for providing a lanyard system for removable pieces connected to and detached from a tool by a piece receiver of claim 16 wherein the lanyard assemblies positioned outside the tool each provide a strap with two end regions, have said first strap end region attached by a piece connector to a pivoting two-part bit piece which can supply two different pieces to the user on each lanyard assembly, doubling the number of pieces available to the user, and said second said second strap end region being attached to said retraction system.

* * * * *